(12) United States Patent
Magnarelli et al.

(10) Patent No.: US 9,842,371 B1
(45) Date of Patent: Dec. 12, 2017

(54) METHOD AND APPARATUS FOR CREATING A SAVINGS PLAN FOR A USER

(71) Applicant: INTUIT INC., Mountain View, CA (US)

(72) Inventors: James N. Magnarelli, Wilmington, MA (US); Elise Marie Fung, Los Altos, CA (US); Harshavardhan Srinivasan, Rochester, NY (US); Qitong Xu, Boston, MA (US); Soham Samir Mody, Mountain View, CA (US); Gina M. Ruscio, Boston, MA (US)

(73) Assignee: INTUIT INC., Mountain View, CA (US)

( * ) Notice: Subject to any disclaimer, the term of this patent is extended or adjusted under 35 U.S.C. 154(b) by 552 days.

(21) Appl. No.: 14/309,009

(22) Filed: Jun. 19, 2014

(51) Int. Cl.
*G06Q 40/00* (2012.01)

(52) U.S. Cl.
CPC .................. *G06Q 40/12* (2013.12)

(58) Field of Classification Search
CPC ...... G06Q 40/06; G06Q 40/00; G06Q 20/405; G06Q 40/12
USPC .................. 705/30, 28, 36 R, 35, 38, 39, 43
See application file for complete search history.

(56) References Cited

U.S. PATENT DOCUMENTS

| | | | |
|---|---|---|---|
| 8,346,617 B1* | 1/2013 | Tanquary | G06Q 30/0207 705/26.1 |
| 8,639,622 B1* | 1/2014 | Moore | G06Q 20/405 705/35 |
| 2008/0228606 A1* | 9/2008 | Megdal | G06Q 40/02 705/30 |
| 2009/0106136 A1* | 4/2009 | Wright | G06Q 40/06 705/35 |
| 2010/0100469 A1* | 4/2010 | Buchanan | G06Q 10/06 705/35 |
| 2012/0284183 A1* | 11/2012 | Summerrow | G07F 7/08 705/42 |
| 2013/0103580 A1* | 4/2013 | Ventura | G06Q 40/02 705/40 |
| 2015/0073952 A1* | 3/2015 | Ventura | G06Q 40/12 705/30 |
| 2015/0220951 A1* | 8/2015 | Kurapati | G06Q 30/0204 705/7.33 |
| 2016/0078559 A1* | 3/2016 | Ventura | G06Q 40/02 705/30 |

* cited by examiner

*Primary Examiner* — Vanel Frenel
(74) *Attorney, Agent, or Firm* — Patterson + Sheridan, LLP

(57) ABSTRACT

One embodiment of the present invention provides a system for creating a savings plan for a user. During operation, the system receives demographic data associated with the user. Next, the system determines average spending for pre-selected spending categories for a set of users with similar demographic data to the user. The system then receives financial data associated with the user. After that, the system analyzes the financial data to create a comparison of how spending by the user in the pre-selected categories compares to average spending for the set of users with similar demographic data. Finally, the system uses the comparison to facilitate a savings plan for the user.

16 Claims, 3 Drawing Sheets

METHOD AND APPARATUS FOR CREATING A SAVINGS PLAN FOR A USER

BACKGROUND

Related Art

Many individuals have problems budgeting for important items with high costs, such as insurance, rent, and taxes. Without proper budgeting techniques, these individuals do not set aside the necessary funds to pay for these important items, while many of them spend on frivolous items or simply overpay for other items that could be purchased more cheaply. While a number of these individuals would like to have a better financial plan, budgeting is a daunting process for them.

Many tools have been created to help these individuals budget better and save for big-ticket items. However, budgeting is an ongoing task and requires dedication and resolve to stay on track. Hence, many individuals fail to stick to their budget.

SUMMARY

One embodiment of the present invention provides a system for creating a savings plan for a user. During operation, the system receives demographic data associated with the user. Next, the system determines average spending for pre-selected spending categories for a set of users with similar demographic data to the user. The system then receives financial data associated with the user. After that, the system analyzes the financial data to create a comparison of how spending by the user in the pre-selected categories compares to average spending for the set of users with similar demographic data. Finally, the system uses the comparison to facilitate a savings plan for the user.

In some embodiments of the present invention, facilitating a savings plan for the user involves displaying to the user spending categories for which the user spends more than the average spending for the set of users with similar demographic data.

In some embodiments of the present invention, facilitating a savings plan for the user involves taxing the user on an amount the user spends in each category that exceeds the average spending for the set of users with similar demographic data.

In some embodiments of the present invention, taxing the user involves automatically transferring funds to an account associated with the savings plan.

In some embodiments of the present invention, facilitating a savings plan for the user involves suggesting alternative spending in each category where the user spends more than the average spending for the set of users with similar demographic data.

In some embodiments of the present invention, the system receives funds from a third party into an account associated with the savings plan when the user performs the alternative spending.

In some embodiments of the present invention, the system sends a code to third parties wherein the code includes a link that facilitates the third parties contributing funds directly to an account associated with the savings plan.

In some embodiments of the present invention, the system receives funds from a third party into an account associated with the savings plan when the user performs a pre-determined action.

In some embodiments of the present invention, the system receives funds from the user into an account associated with the savings plan.

In some embodiments of the present invention, receiving the funds includes at least one of: receiving a recurring payment; receiving a one-time payment; receiving a tax refund; and receiving a percentage of a deposit destined for a different account.

In some embodiments of the present invention, receiving the financial data associated with the user involves receiving the financial data from a financial institution associated with the user.

In some embodiments of the present invention, receiving the financial data associated with the user involves receiving the financial data from a financial software application installed on a computer associated with the user.

In some embodiments of the present invention, receiving the financial data associated with the user involves receiving the financial data from a third-party financial information aggregator associated with the user.

In some embodiments of the present invention, receiving the demographic data associated with the user involves receiving the demographic data from a tax return associated with the user.

DETAILED DESCRIPTION

Figure 1:
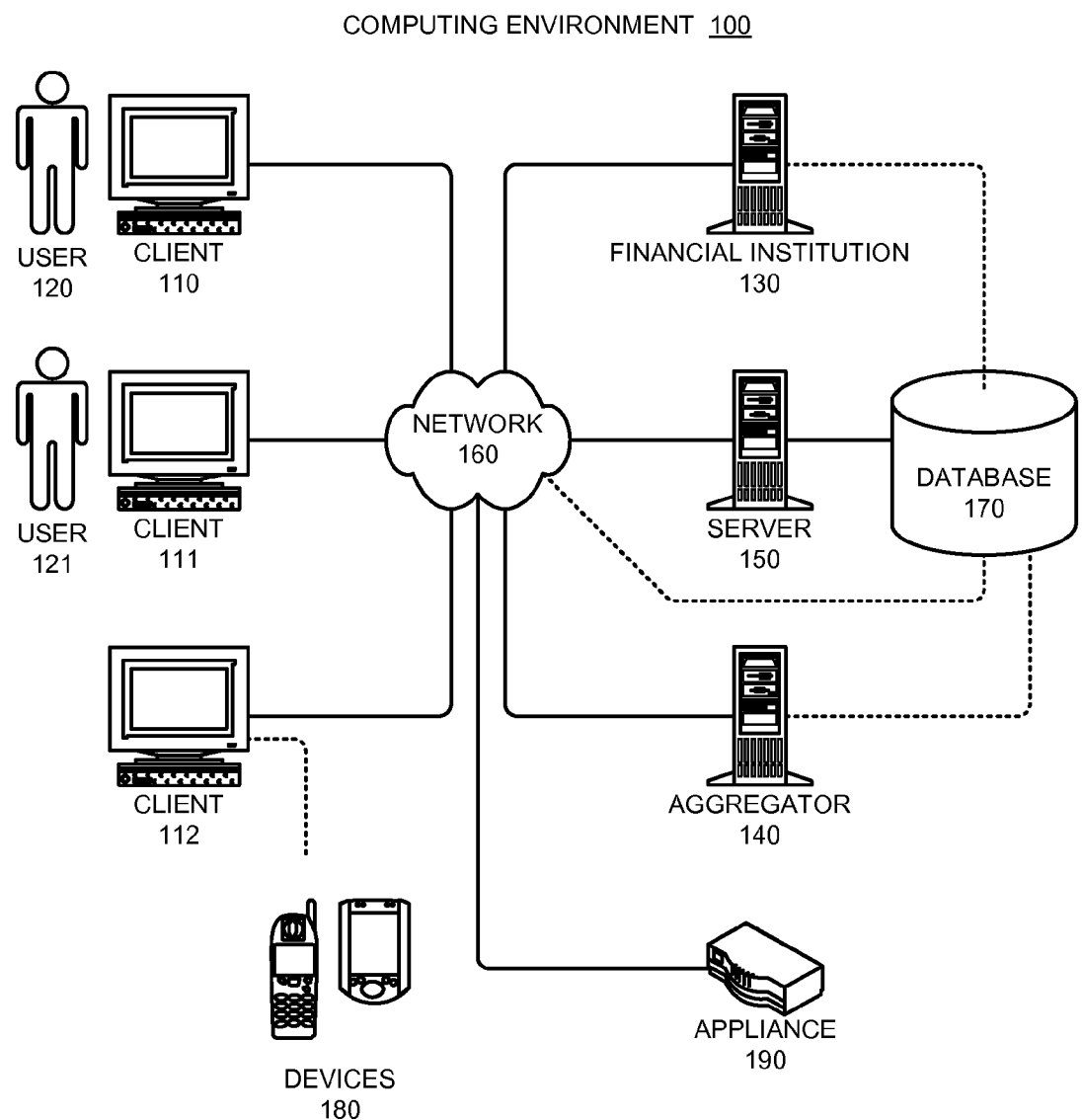
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for creating a savings plan for a user. During operation, the system receives demographic data associated with the user. This demographic data can include age, race, sex, profession, height, weight, geographic location, religious affinity, etc. Virtually any type of demographic information that can be used to categorize the user and/or associate the user with other users may be included in these embodiments. Next, the system determines average spending for pre-selected spending categories for a set of users with similar demographic data to the user. The system then receives financial data associated with the user. After that, the system analyzes the financial data to create a comparison of how spending by the user in the pre-selected categories compares to average spending for the set of users with similar demographic data. Finally, the system uses the comparison to facilitate a savings plan for the user.

Note that embodiments of the present invention can be used in conjunction with saving for a big-ticket item such as a health insurance plan, paying rent, or saving for a down payment on a new house, or can be used without any planned large expenditures simply as a way to build up a cash reserve.

In some embodiments of the present invention, facilitating a savings plan for the user involves displaying to the user spending categories where the user spends more than the average spending for the set of users with similar demographic data. Note that for some users simply seeing how he or she spends compared to others is enough motivation to reduce spending and increase savings. In these situations, sometimes the user is simply unaware how much he or she is spending on certain categories such as daily trips to a coffee house.

In some embodiments of the present invention, facilitating a savings plan for the user involves taxing the user on an amount the user spends in each category that is more than the average spending for the set of users with similar demographic data. Consider, for example, the scenario described above where an individual makes a couple of trips a day to a local coffee house for a large latte. In this scenario, the system might determine that the average user with similar demographics purchases three lattes per week. In order to help the user save money, the system could "tax" the user on every latte purchase in excess of three in a given week.

In some embodiments of the present invention, taxing the user involves automatically transferring funds to an account associated with the savings plan. In these embodiments, this tax is simply transferred to a savings account associated with the user. Thus, this "tax" helps the user save toward future expenditures. Note that this account can be restricted and earmarked for certain expenditures, such as an escrow account. In other embodiments, this account may contain timed withdrawal restrictions, such as with Certificates of Deposit (CDs). Virtually any financial instrument capable of accepting funds may be used with embodiments of the present invention.

In some embodiments of the present invention, facilitating a savings plan for the user involves suggesting alternative spending in each category where the user spends more than the average spending for the set of users with similar demographic data. For example, the system may determine that a particular user spends twice the monthly average in a particular category than others who are in the same demographic classification. Additionally, the system may determine that the user purchases goods and services in the category from a particular merchant, while most other users in the same demographic classification purchase their goods and services from a different merchant. In this example, the system may suggest to the user to investigate the different merchant, which may have better prices.

In some embodiments of the present invention, the system receives funds from a third party into an account associated with the savings plan when the user performs the alternative spending. For example, the system may determine that the user purchases groceries from ABC Market, which is relatively expensive, while most users in the same demographic classification purchase their groceries from discount market XYZ Foods. In this example, not only would the user save money by switching to XYZ Foods, but XYZ Foods might also make a contribution into the savings plan of the user.

In some embodiments of the present invention, the system sends a code to third parties wherein the code includes a link that facilitates the third parties contributing funds directly to an account associated with the savings plan. Note that these links can be sent directly by the user, or the system can send them on behalf of the user. In some embodiments, the system may send the link to the user's family and friends to help contribute to the user's savings plan. In other embodiments, the system may post the link on social media sites on behalf of the user.

In some embodiments of the present invention, the system receives funds from a third party into an account associated with the savings plan when the user performs a pre-determined action. For example, consider the scenario where a user is using the savings plan to save for health care insurance premiums. In this scenario, the health care insurance provider has an incentive for the user to remain healthy. In order to encourage the user to make healthy choices, the health care insurance provider may add financial contributions to the user's savings account via the link when the user checks in at a gym or health food store. In addition, the health care insurance provider may opt to not make the contribution if the user visited a fast-food restaurant the same day.

In some embodiments of the present invention, the system receives funds from the user into an account associated with the savings plan. While embodiments of the present invention facilitate user savings via awareness of spending habits and incentives for spending behavior modification, embodiments of the present invention also encourage the user to make regular financial contributions to the savings plan.

In some embodiments of the present invention, receiving the funds includes at least one of: receiving a recurring payment; receiving a one-time payment; receiving a tax refund; and receiving a percentage of a deposit destined for a different account.

In some embodiments of the present invention, receiving the financial data associated with the user involves receiving the financial data from a financial institution associated with the user. For example, the system may receive a set of financial transactions directly from the user's financial institution, such as a bank, credit lender, or credit union.

In some embodiments of the present invention, receiving the financial data associated with the user involves receiving the financial data from a financial software application installed on a computer associated with the user. For example, the system may use the information collected from the user's financial management software. This can include transactions that were manually entered by the user, as well as transactions that were automatically downloaded from various financial institutions by the financial management software.

In some embodiments of the present invention, receiving the financial data associated with the user involves receiving the financial data from a third-party financial information aggregator associated with the user. For example, many users use third-party credit monitoring and aggregator services that collect information associated with the user from various financial institutions. In some embodiments, the system may collect information from the aggregator rather than from the various financial institutions directly.

In some embodiments of the present invention, receiving the demographic data associated with the user involves receiving the demographic data from a tax return associated with the user.

In some embodiments, the savings plan can be used to directly fund items for which the savings plan was established. For example, if the savings plan was established to help pay for health care insurance premiums, the health care premiums can be paid directly from the savings plan account when the premiums are due, or as soon as the funding in the savings plan account reaches a pre-determined level.

In some embodiments, when creating the savings plan, the system considers payments made to a provider on the user's behalf. For example, under the Affordable Care Act, the Federal Government may subsidize insurance premiums for a large portion of the population. In this example, the system may take this subsidy into account when helping the user budget toward their premiums, despite the fact that the subsidy would never be paid to the user, and would never enter the account associated with the savings plan. Thus, the system considers these subsidies in the savings plan, even though no money associated with the subsidy is ever directly handled by the user.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 130 belongs to a financial institution while server 140 belongs to an aggregator.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
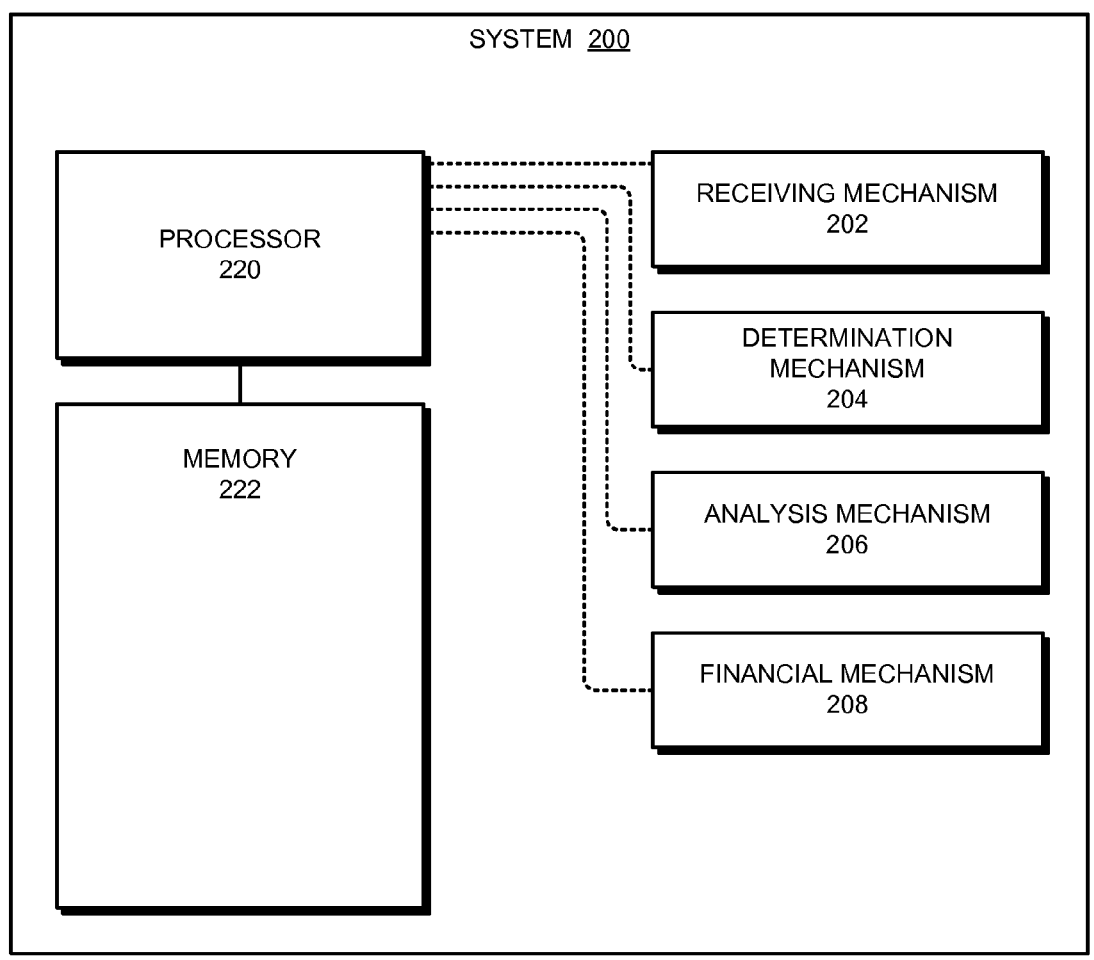
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, determination mechanism 204, analysis mechanism 206, financial mechanism 208, processor 220, and memory 222.

Creating a Savings Plan

Figure 3:
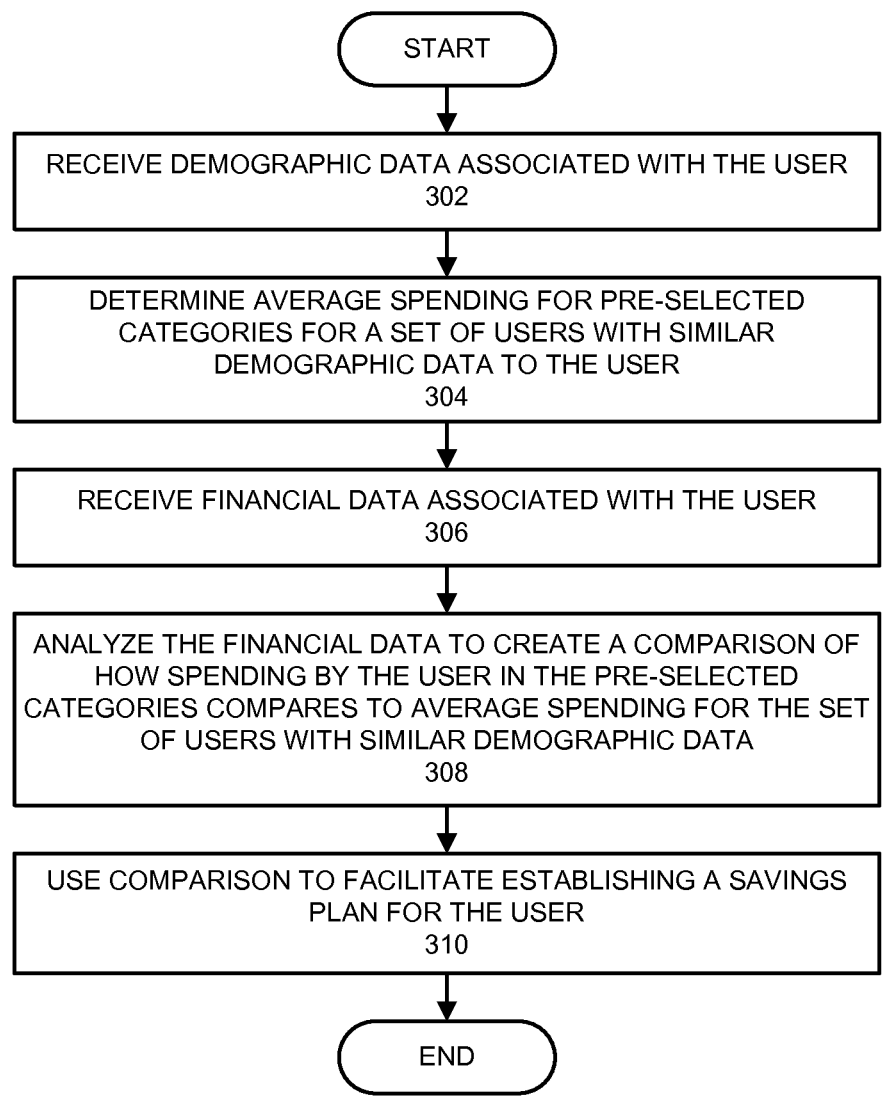
FIG. 3 presents a flow chart illustrating the process of creating a savings plan in accordance with an embodiment of the present invention.

FIG. 3 presents a flow chart illustrating the process of creating a savings plan in accordance with an embodiment of the present invention.

During operation, receiving mechanism 202 receives demographic data associated with user 120 (operation 302). Note that this can include data such as age, sex, location, ideal budget, insurance preferences, household size, household income, race, etc. Next, determination mechanism 204 determines average spending for pre-selected spending categories for a set of users with similar demographic data to user 120 (operation 304). Receiving mechanism 202 then receives financial data associated with user 120 (operation 306). Next, analysis mechanism 206 analyzes the financial data to create a comparison of how spending by user 120 in the pre-selected categories compares to average spending for the set of users with similar demographic data (operation 308). Finally, financial mechanism 208 uses the comparison to facilitate establishing a savings plan for user 120 (operation 310). Note that, as described previously, in some embodiments, when creating the savings plan, financial mechanism 208 considers payments made to a provider on user 120's behalf. This can include monies received at the provider from a third-party, including rebates and subsidy payments.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for creating a savings plan for a user via a financial management tool executing on a server computer, the method comprising:
    receiving demographic data associated with the user via the financial management tool;
    determining average spending for pre-selected spending categories for a set of users with similar demographic data to the user;
    receiving financial data associated with the user;
    determining, from the financial data, an amount spent by the user in the pre-selected categories;
    comparing the amount spent by the user in the pre-selected categories to the average spending for the set of users with similar demographic data in the pre-selected spending categories;
    associating a financial account with the savings plan for the user based on the comparison; and
    upon determining an amount spent by the user exceeds the average spending for the set of users with similar demographic data in one or more of the pre-selected categories, transferring an amount of funds to the account associated with the savings plan, the amount of funds transferred equal to the amount spent by the user in excess of the average spending for the set of users in each of the one or more pre-selected categories.

2. The computer-implemented method of claim 1, further comprising:
    displaying to the user spending categories in which the user spends more than the average spending for the set of users with similar demographic data.

3. The computer-implemented method of claim 1, further comprising:
    suggesting alternative spending in each category where the user spends more than the average spending for the set of users with similar demographic data.

4. The computer-implemented method of claim 3, further comprising:
    receiving funds from a third party into the account associated with the savings plan when the user performs the alternative spending.

5. The computer-implemented method of claim 1, further comprising:
    sending a code to one or more third parties wherein the code includes a link that facilitates the one or more third parties contributing funds directly to the account associated with the savings plan.

6. The computer-implemented method of claim 1, further comprising:
    receiving funds from a third party into the account associated with the savings plan when the user performs a pre-determined action.

7. The computer-implemented method of claim 1, further comprising:
    receiving funds from the user into the account associated with the savings plan.

8. The computer-implemented method of claim 7, wherein receiving the funds includes receiving at least one of:
    a recurring payment;
    a one-time payment;
    a tax refund; and
    a percentage of a deposit destined for a different account.

9. The computer-implemented method of claim 1, wherein the financial data associated with the user is received from a financial institution associated with the user.

10. The computer-implemented method of claim 1, wherein the financial data associated with the user is received from a financial software application installed on a computer associated with the user.

11. The computer-implemented method of claim 1, wherein the financial data associated with the user is received from a third-party financial information aggregator associated with the user.

12. The computer-implemented method of claim 1, wherein the demographic data associated with the user is received from a tax return associated with the user.

13. A non-transitory computer-readable storage medium storing a financial management tool comprising instructions that when executed by a computer cause the computer to perform a method for creating a savings plan for a user, the method comprising:
    receiving demographic data associated with the user via the financial management tool;
    determining average spending for pre-selected spending categories for a set of users with similar demographic data to the user;
    receiving financial data associated with the user;
    determining, from the financial data, an amount spent by the user in the pre-selected categories;
    comparing the amount spent by the user in the pre-selected categories to the average spending for the set of users with similar demographic data in the pre-selected spending categories;
    associating a financial account with the savings plan for the user based on the comparison; and
    upon determining an amount spent by the user exceeds the average spending for the set of users with similar demographic data in one or more of the pre-selected categories, transferring an amount of funds to the account associated with the savings plan, the amount of funds transferred equal to the amount spent by the user in excess of the average spending for the set of users in each of the one or more pre-selected categories.

14. The non-transitory computer-readable storage medium of claim 13, the method further comprising:
    displaying to the user spending categories in which the user spends more than the average spending for the set of users with similar demographic data.

15. The non-transitory computer-readable storage medium of claim 13, the method further comprising:
  suggesting alternative spending in each category where the user spends more than the average spending for the set of users with similar demographic data.

16. An apparatus configured to execute a financial management tool for creating a savings plan for a user, comprising:
  a memory;
  a processor; and
  a computer-readable storage medium storing instructions that, when executed by the processor, cause the apparatus to perform a method comprising:
    receiving demographic data associated with the user via the financial management tool;
    determining average spending for pre-selected spending categories for a set of users with similar demographic data to the user;
    receiving financial data associated with the user;
    determining, from the financial data, an amount spent by the user in the pre-selected categories;
    comparing the amount spent by the user in the pre-selected categories to the average spending for the set of users with similar demographic data in the pre-selected spending categories;
    associating a financial account with the savings plan for the user based on the comparison; and
    upon determining an amount spent by the user exceeds the average spending for the set of users with similar demographic data in one or more of the pre-selected categories, transferring an amount of funds to the account associated with the savings plan, the amount of funds transferred equal to the amount spent by the user in excess of the average spending for the set of users in each of the one or more pre-selected categories.

* * * * *